US 8,862,904 B2

(12) United States Patent
Ginzburg et al.

(10) Patent No.: US 8,862,904 B2
(45) Date of Patent: Oct. 14, 2014

(54) TECHNIQUES FOR DISTRIBUTED MANAGEMENT OF WIRELESS DEVICES WITH SHARED RESOURCES BETWEEN WIRELESS COMPONENTS

(75) Inventors: Boris Ginzburg, Haifa (IL); Sharon Ben-Porath, Nes-Ziona (IL); Oren Kaidar, Binyamina (IL); Shlomo Avital, Jerusalem (IL); Avishay Sharaga, Beit Nehemya (IL); Max Fudim, Newton, MA (US); Eran Friedlander, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 12/215,354

(22) Filed: Jun. 25, 2008

(65) Prior Publication Data
US 2009/0327767 A1    Dec. 31, 2009

(51) Int. Cl.
*G06F 1/00* (2006.01)
*H04W 88/06* (2009.01)
*H04W 52/02* (2009.01)

(52) U.S. Cl.
CPC .......... *H04W 88/06* (2013.01); *H04W 52/0274* (2013.01)
USPC ........ 713/300; 710/4; 710/5; 710/43; 710/57; 710/300

(58) Field of Classification Search
USPC .......... 713/300, 4, 5, 43, 57; 714/4, 5, 43, 57
See application file for complete search history.

(56) References Cited

U.S. PATENT DOCUMENTS

| | | | | |
|---|---|---|---|---|
| 5,954,800 A * | 9/1999 | Jung et al. | ...................... | 709/250 |
| 6,108,345 A * | 8/2000 | Zhang | ........................... | 370/445 |
| 6,978,395 B2 * | 12/2005 | Gottlieb | ........................ | 714/4.4 |
| 7,320,017 B1 * | 1/2008 | Kurapati et al. | ............. | 709/202 |
| 7,653,392 B2 * | 1/2010 | Ovadia et al. | ............... | 455/435.2 |
| 7,664,851 B2 * | 2/2010 | Hardy et al. | ................... | 709/224 |
| 7,669,064 B2 * | 2/2010 | Johnson et al. | ............... | 713/300 |
| 7,899,878 B2 * | 3/2011 | Gopal et al. | .................. | 709/207 |
| 7,930,573 B2 * | 4/2011 | Bland et al. | ................... | 713/320 |
| 8,064,444 B2 * | 11/2011 | Connors et al. | ............... | 370/390 |
| 2002/0181416 A1 * | 12/2002 | Lee et al. | ....................... | 370/327 |
| 2003/0125019 A1 | 7/2003 | Bajikar | | |
| 2003/0167347 A1 * | 9/2003 | Combs et al. | ................. | 709/250 |
| 2003/0177406 A1 * | 9/2003 | Bradley et al. | ................ | 713/300 |
| 2004/0048577 A1 * | 3/2004 | Godfrey et al. | ............. | 455/67.11 |
| 2004/0225892 A1 * | 11/2004 | Bear et al. | ...................... | 713/200 |
| 2007/0073832 A1 * | 3/2007 | Curtis et al. | .................. | 709/217 |
| 2007/0135162 A1 * | 6/2007 | Banerjea et al. | ........... | 455/556.1 |

(Continued)

OTHER PUBLICATIONS

International Search Report in related application PCT/US2009/047256 mailed Dec. 18, 2009.

(Continued)

*Primary Examiner* — Idriss N Alrobaye
*Assistant Examiner* — Getente A Yimer
(74) *Attorney, Agent, or Firm* — Pillsbury Winthrop Shaw Pittman LLP

(57) ABSTRACT

An embodiment of the present invention provides an apparatus, comprising a network adapter configured for wireless communication using more than one technology using distributed management and wherein the network adapter is configured to share a plurality of shared hardware components by automatically turning all other comms to OFF when one comm is turned to ON.

21 Claims, 2 Drawing Sheets

(56) References Cited

U.S. PATENT DOCUMENTS

| | | | |
|---|---|---|---|
| 2007/0253339 A1 | 11/2007 | Ovadia et al. | |
| 2007/0263710 A1 | 11/2007 | Kasslin et al. | |
| 2008/0016197 A1* | 1/2008 | Hardy et al. | 709/223 |
| 2008/0104424 A1* | 5/2008 | Jennings | 713/300 |
| 2009/0031043 A1* | 1/2009 | Schaade | 709/245 |
| 2009/0172433 A1* | 7/2009 | Hady | 713/320 |

OTHER PUBLICATIONS

Taiwan Office Action, Taiwanese Patent Application No. 98120289, mail date: Dec. 24, 2012, total of 4 pages.

State Intellectual Property Office, P.R. China, Chinese Office Action, Application No. 200910139896.0, date of issue: Nov. 5, 2012, total of 11 pages.

English translation of the Korean Office Action issued in KR Application No. 2010-7021319, dated May 15, 2012, 5 pages.

* cited by examiner

TECHNIQUES FOR DISTRIBUTED MANAGEMENT OF WIRELESS DEVICES WITH SHARED RESOURCES BETWEEN WIRELESS COMPONENTS

BACKGROUND

As wireless communication technology evolves and improves, different wireless communication technologies must coexist in a given platform. As different wireless communication technologies may have benefits and superior performance in a particular usage scenario, it is advantageous to enable multiple wireless communication technologies to be used for a particular device. Further, different wireless comms (also referred to herein as wireless communications) might share some of the hardware components on the device (such radio, antennas etc). Sharing hardware components might limit the usage of the device in a way that at a given time only one of the wireless comms can use the hardware to transmit or receive.

Thus, it would be advantageous to improve the ability for wireless devices and apparatus to share hardware components when multiple communication technologies coexist.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
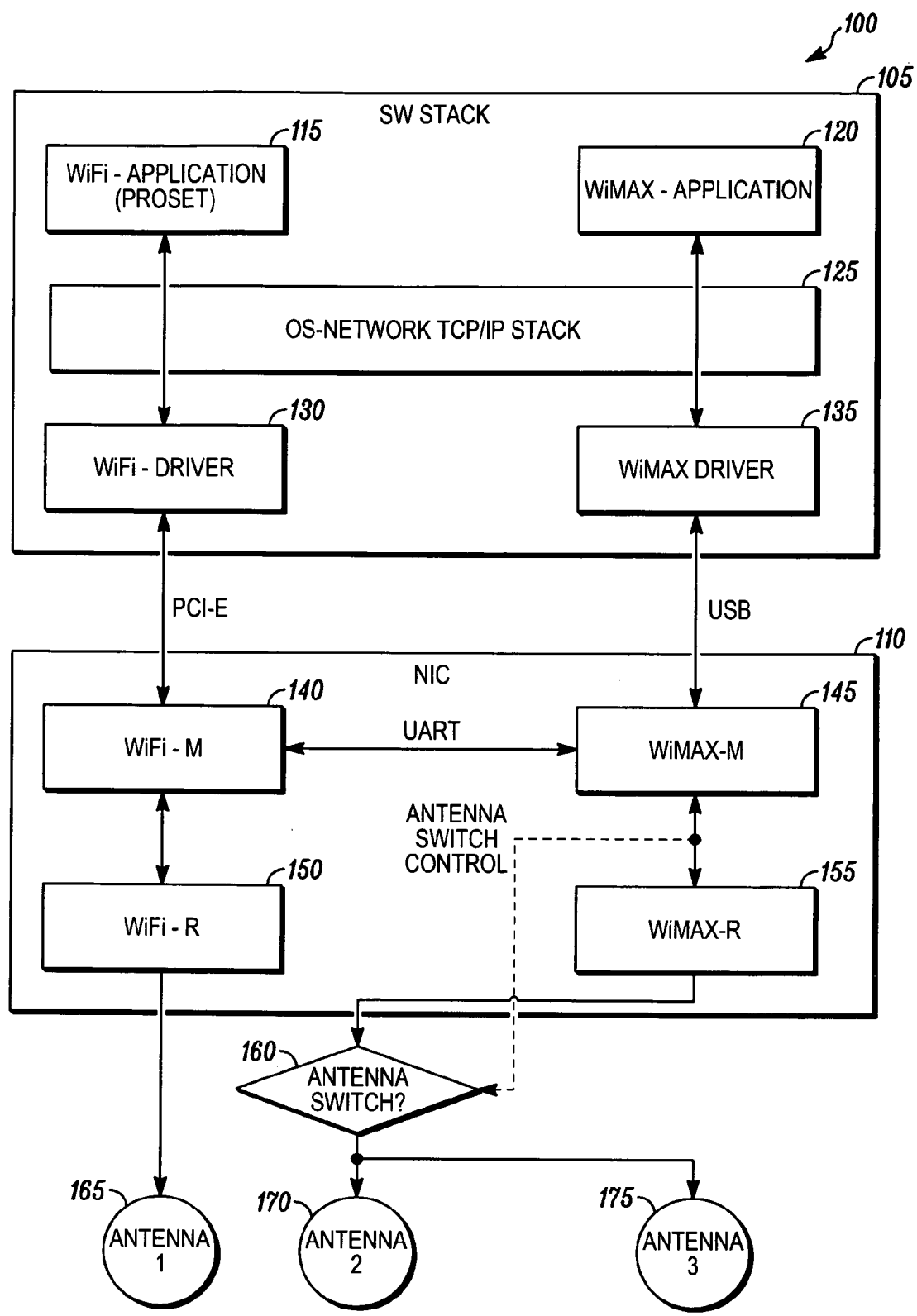
FIG. 1 illustrates an example of a WiFi-WiMAX combo device with distributed management utility of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device or a handheld PDA device.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

A wireless multicomm device as described herein may be a network adapter that combines more then one wireless technology (each wireless technology may be referred as a "comm"). The different wireless comms might share some of the hardware components on the device (such radio, antennas etc)—it is understood that this list is not exhaustive of the hardware components that may be shared. Sharing hardware components might limit the usage of the device in a way that at a given time only one of the wireless comms can use the hardware to transmit or receive.

As used herein, in an embodiment of the present invention, the term "multicomm device" also may provide a wireless-multicomm device with shared hardware (HW) that limits the access to the air to one comm only at a given time.

In an embodiment of the present invention, the multicomm device may be controlled in one of the following ways:

1. A single Connection Utility (also known as Connection Manager), that is aware of the multicomm device unique design. This utility is aware of the connectivity status of all comms (who owns the shared resources), and it can make connectivity decisions based on that knowledge. This may be referred to as centralized management.

2. Each one of the comms has its own Connection utility (CU). All CUs are aware of the multicomm device's unique design. In this configuration, when one comm needs to gain the shared resources—it might ask for the user permission to disassociate the other comm. (Each CU needs to be aware of the connectivity status of the other comms). This may be referred to as Distributed management—but using tightly coupled entities.

3. Each one of the comms has its own Connection utility (CU)—the CUs are not aware of the Multicomm device limitation.

Looking now at FIG. 1, shown generally as 100, is an example of WiFi-WiMAX combo device with a distributed management utility. Software (SW) stack 105 may be interfaced with network interface controller (NIC) 110 via USB or PCI-E bus. The NIC may be in communication with antenna switch 160, antenna 1 165, antenna 2 170 and antenna 3 175.

SW stack 105 may include WiFi application 115 in communication with WiFi driver 130 and WiMAX application 120 in communication with WiMAX driver 135 via OS—network TCP/IP stack 125. A NIC of an embodiment of the present invention may include WiFi-M 140 in communication with WiFi driver 130 via PCI-E and further in communication with WiFi-R 150 on said NIC. WiFi-M 140 may further be in communication with WiMax-M via UART (it is understood that the present invention is not limited in this respect) which may be in communication with WiMAX driver 135 via USB. WiMAX-M 145 on NIC 110 may also be in communication with WiMAX-R 155 with antenna control existing therebetween, which may be in direct communication with antenna switch 160—again, it is understood that the present invention is not limited to this architecture.

Figure 2:
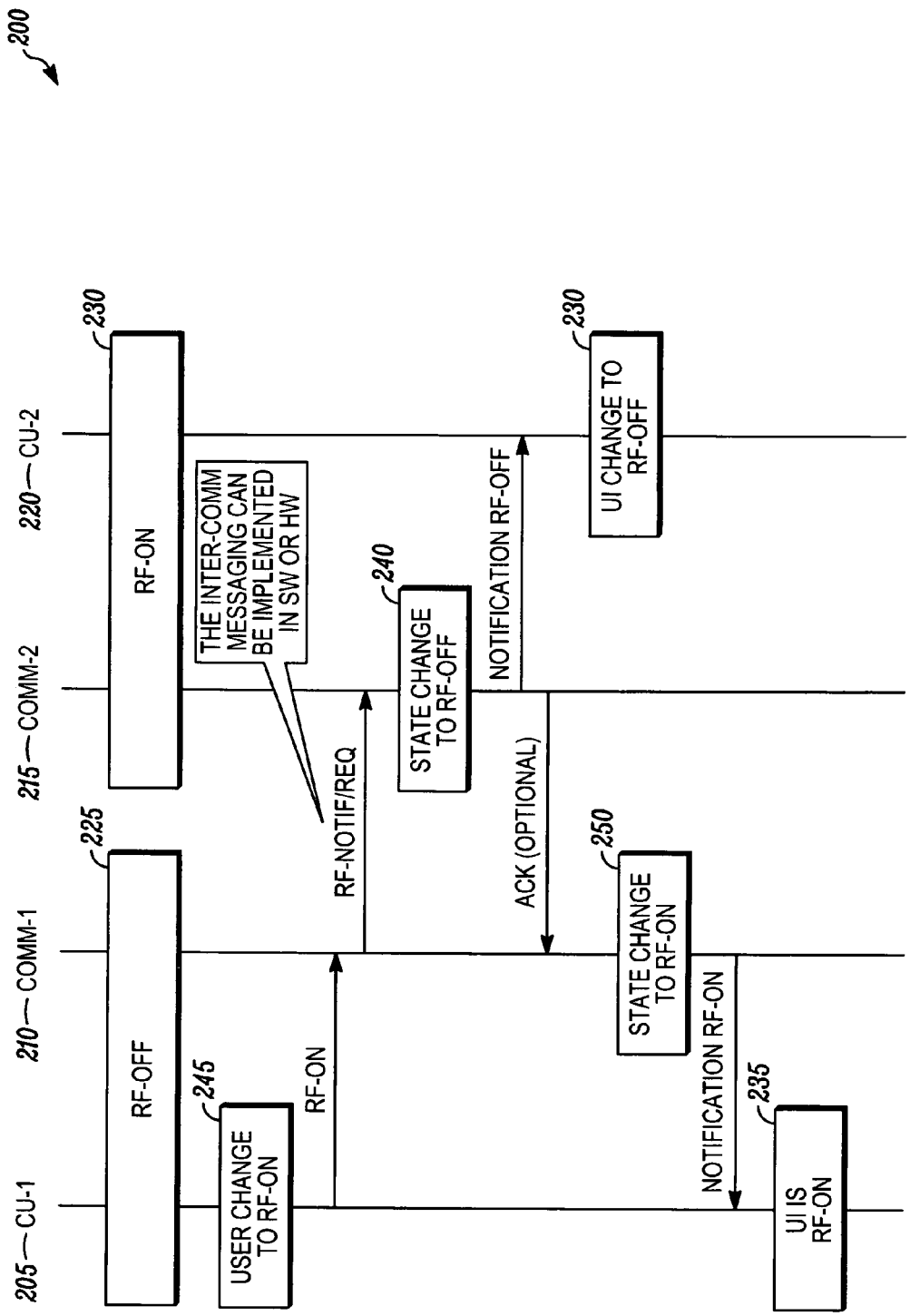
FIG. 2 shows the switching flow of an embodiment of the present invention.

Looking now at 200 of FIG. 2 is a switch flow of an embodiment of the present invention and provides a method for distributed management, but closely coupled, of multi-comm devices with shared resources between comms using CUs 205 and 220 that may be unaware of the multicomm design. This flow may include:

1. Turning one comm 215 to ON 230 (using for example, but not limited to, a software radio switch), which will turn all other comms in the device to OFF 225. This may occur automatically in an embodiment of the present invention. This will result in a situation where at a given time only one Comm is ON, and there is no competition on the shared resources.

2. The comms must have an inter-comm interface to exchange messages (this interface is used for sending the message from one comm to others to turn their state to OFF) 240. This interface may be implemented in software or hardware 3. When comm-1 210 is been informed that other comm (comm-2) 215 is turned ON 245 (and hence it shall turn itself OFF), than comm-1 210 may generate a notification 250 to the CU 205 that indicates that comm-2 215 is OFF (for example, but not limited to, the SW radio OFF notification). The CU when it gets this notification can reflect the new status of the comm in the user interface (UI) 230 and 235.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

We claim:

1. An apparatus, comprising:
a network adapter configured for wireless communication using at least two disparate communication technologies based on distributed management of a plurality of shared hardware components, wherein the distributed management provides that each one of the at least two disparate communication technologies is associated with a corresponding Connectivity Utility (CU), wherein a first communication technology from the at least two disparate communication technologies is configured to send a message to a second communication technology from the at least two disparate communication technologies indicating that the first communication technology is to be turned ON and the second communication technology is to be turned OFF, and wherein, upon receipt of the message from the first communication technology, the second communication technology is configured to generate a notification to the corresponding CU indicating that said second communication technology is to be turned OFF, and responsive to the notification, the corresponding CU is configured to turn OFF the second communication technology, such that only the first communication technology is in the ON state at a given time to use the plurality of shared hardware component.

2. The apparatus of claim 1, further comprising an inter-comm interface configured to exchange messages between the at least two communication technologies to enable turning one of the at least two communication technologies to OFF.

3. The apparatus of claim 2, wherein said inter-comm interface is implemented in software or hardware.

4. The apparatus of claim 1, wherein when said CU gets said notification, said CU is configured to reflect the respective ON or OFF status of said first and second communication technologies in a user interface.

5. A method, comprising:
configuring a network adapter for wireless communication using at least two disparate communication technologies based on distributed management of a plurality of shared hardware components, wherein the distributed management provides that each one of the at least two disparate communication technologies is associated with a corresponding Connectivity Utility (CU);
sending a message from a first communication technology from the at least two disparate communication technologies to a second communication technology from the at least two disparate communication technologies indicating that the first communication technology is to be turned ON and the second communication technology is to be turned OFF;
upon receipt of the message from the first communication technology, generating a notification at the second communication technology for the corresponding CU thereof indicating that said second communication technology is to be turned OFF; and
switching OFF the second communication technology by the corresponding CU thereof, such that only the first communication technology is in the ON state at a given time to use the plurality of shared hardware component.

6. The method of claim 5, further comprising using an inter-comm interface configured to exchange messages between the at least two communication technologies to enable turning one of the at least two communication technologies to OFF.

7. The method of claim 6, wherein said inter-comm interface is implemented in software or hardware.

8. The method of claim 5, further comprising reflecting the respective ON or OFF status of said first and second communication technologies in a user interface when said CU gets said notification.

9. An article comprising a non-transitory storage medium having stored thereon instructions, that, when executed by a computing platform, result in:
configuring a network adapter for wireless communication using at least two disparate communication technologies based on distributed management of a plurality of shared hardware components, wherein the distributed management provides that each one of the at least two disparate communication technologies is associated with a corresponding Connectivity Utility (CU);
sending a message from first communication technology from the at least two disparate communication technologies to a second communication technology from the at least two disparate communication technologies indicating that the first communication technology is to be turned ON and the second communication technology is to be turned OFF;
upon receipt of the message from the first communication technology, generating a notification at the second communication technology for the corresponding CU thereof indicating that said second communication technology is to be turned OFF; and switching OFF the second communication technology by the corresponding CU thereof, such that only the first communication technology is in the ON state at a given time to use the plurality of shared hardware component.

10. The article of claim 9, comprising further instructions that when executed further result in using an inter-comm interface to exchange messages between the at least two communication technologies to enable turning one of the at least two communication technologies to OFF.

11. The article of claim 10, wherein said inter-comm interface is implemented in software or hardware.

12. The article of claim 9, comprising further instructions that when executed further result in reflecting the respective ON or OFF status of said first and second communication technologies in a user interface when said CU gets said notification.

13. The apparatus of claim 1, wherein the first communication technology is configured to generate a notification to the corresponding CU thereof that indicates that said first communication technology is turned ON.

14. The method of claim 5, further comprising generating a notification to the corresponding CU thereof that indicates that said first communication technology is turned ON.

15. The article of claim 9, comprising further instructions that when executed further result in generating a notification to the corresponding CU thereof that indicates that said first communication technology is turned ON.

16. An apparatus, comprising:
a network adapter configured for wireless communication using at least two disparate wireless technologies based on distributed management of a plurality of shared hardware components, wherein each of the at least two wireless technologies is associated with a corresponding Connectivity Utility (CU) and the distributed management includes managing connectivity of the at least two wireless technologies using each corresponding CU, such that the CU associated with one of the at least two wireless technologies is aware of the connectivity status of the other of the at least two wireless technologies, and responsive to a notification received from its wireless technologies, the CU is configured to turn ON or OFF the wireless technology, such that only one of at least two disparate wireless technologies is in the ON state at a given time to use the plurality of shared hardware components.

17. The apparatus of claim 16, wherein the at least two wireless technologies include disparate wireless technologies based on different wireless standards.

18. A method, comprising:
configuring a network adapter for wireless communication using at least two disparate wireless technologies based on distributed management of a plurality of shared hardware components, wherein each of the at least two wireless technologies is associated with a corresponding Connectivity Utility (CU) and the distributed management includes managing connectivity of the at least two wireless technologies using each corresponding CU, such that the CU associated with one of the at least two wireless technologies is aware of the connectivity status of the other of the at least two wireless technologies;
generating a notification at one of the two wireless technologies for the corresponding CU thereof indicating that the at one of the two wireless technologies is to be turned ON or OFF; and
switching ON or OFF the at one of the two wireless technologies by the corresponding CU thereof, such that only one of the two wireless technologies is in the ON state at a given time to use the plurality of shared hardware components.

19. The method of claim 18, wherein the at least two wireless technologies include disparate wireless technologies based on different wireless standards.

20. An article comprising a non-transitory storage medium having stored thereon instructions, that, when executed by a computing platform, result in:
configuring a network adapter for wireless communication using at least two disparate wireless technologies based on distributed management of a plurality of shared hardware components, wherein each of the at least two wireless technologies is associated with a corresponding Connectivity Utility (CU) and the distributed management includes managing connectivity of the at least two wireless technologies using each corresponding CU, such that the CU associated with one of the at least two wireless technologies is aware of the connectivity status of the other of the at least two wireless technologies;
generating a notification at one of the two wireless technologies for the corresponding CU thereof indicating that the at one of the two wireless technologies is to be turned ON or OFF; and
switching ON or OFF the at one of the two wireless technologies by the corresponding CU thereof, such that only one of the two wireless technologies is in the ON state at a given time to use the plurality of shared hardware components.

21. The article of claim 20, wherein the at least two wireless technologies include disparate wireless technologies based on different wireless standards.

* * * * *